Dec. 15, 1936.　　　W. F. BEISLEY ET AL　　　2,064,054
AUTOMOBILE LIGHTING
Filed Feb. 23, 1933　　2 Sheets-Sheet 1

INVENTORS.
WILLIAM F. BEISLEY
HARRY D. SPRADLIN
LOUIS R. DEADRICH
ROBERT H. ECKHOFF
By Robert N. Eckhoff
ATTORNEY Dec. 15, 1936. W. F. BEISLEY ET AL 2,064,054
AUTOMOBILE LIGHTING
Filed Feb. 23, 1933 2 Sheets-Sheet 2
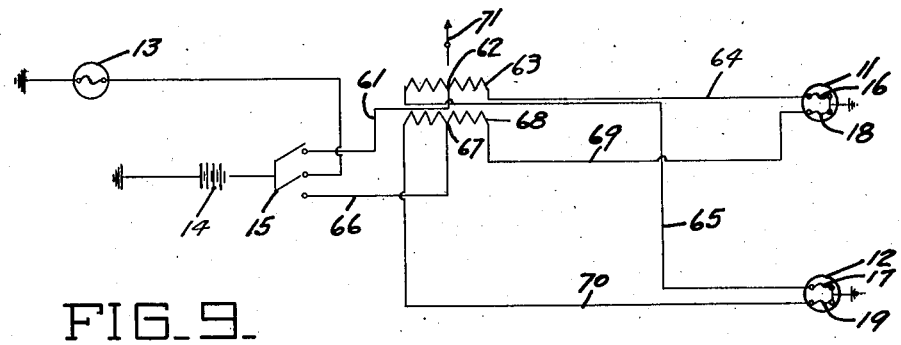
FIG_9_
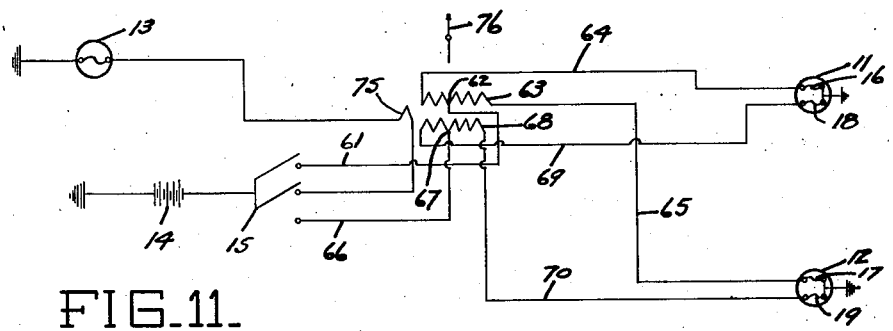
FIG_11_
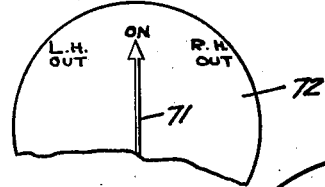
FIG_10_
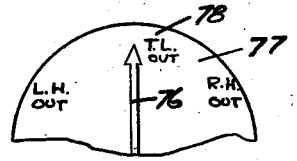
FIG_12_
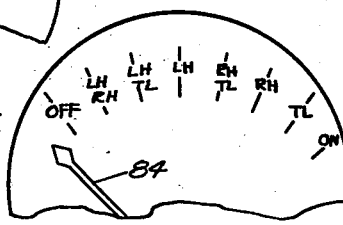
FIG_13_
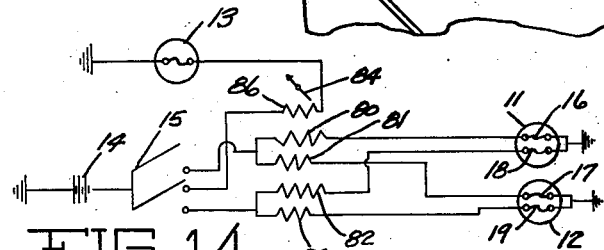
FIG_14_
INVENTORS.
WILLIAM F. BEISLEY
HARRY D. SPRADLIN
LOUIS R. DEADRICH
ROBERT H. ECKHOFF
By Robert H. Eckhoff
ATTORNEY.

Patented Dec. 15, 1936

2,064,054

UNITED STATES PATENT OFFICE 2,064,054

AUTOMOBILE LIGHTING

William F. Beisley, Harry D. Spradlin, Louis R. Deadrich, and Robert H. Eckhoff, Oakland, Calif.

Application February 23, 1933, Serial No. 658,094

3 Claims. (Cl. 177—311)

This invention relates to improvements in automobile lighting circuits and particularly to the provision of novel and improved means for indicating that one of the filaments in the circuit has failed. The invention is particularly applicable to double filament lamps commonly employed as head lamps.

Many serious accidents occur because of one vehicle overtaking another, in rain or fog, and ramming the rear of the first vehicle because the tail light on that vehicle was not burning. Other accidents are attributed to having only one headlight burning so that the proper road illumination is not secured and so that an oncoming car does not clear the side of the vehicle if the light that is out is the one on the side toward the middle of the road. In addition, many States apply penalties when a vehicle is found whose lights are not burning properly. The present invention provides a very simple, inexpensive and convenient form of device which may be readily installed, either in new cars or in second hand cars, to provide an indication, on the dash board, that all lighting circuits are functioning properly. While many devices have previously been suggested for this general purpose, it is believed that none of them have been characterized by the simplicity, ease of installation, and inexpensiveness that characterizes the present invention. The present invention does not employ any special socket, bulb, or require expensive relays or telltale devices.

It is in general the broad object of the present invention to provide an improved but simple, inexpensive, and easily installed device for use in combination with automobile lighting circuits and to provide generally for the improvement of such circuits, in combination, to the end that an automobile driver may be readily apprised of the failure of any of the circuits and the fact that a lamp in the given circuit is not operating.

As before mentioned, the invention is also concerned with double filament lamps and novel means are provided for indicating a failure of either filament in such a lamp.

The invention possesses numerous other advantageous features which, together with the foregoing, will appear in the following wherein the preferred form of the invention has been disclosed.

Figures 7, 9, 11, and 14 are other diagrammatic representations.

Figures 8, 10, 12, and 13 are views of other dials.

Figure 1:
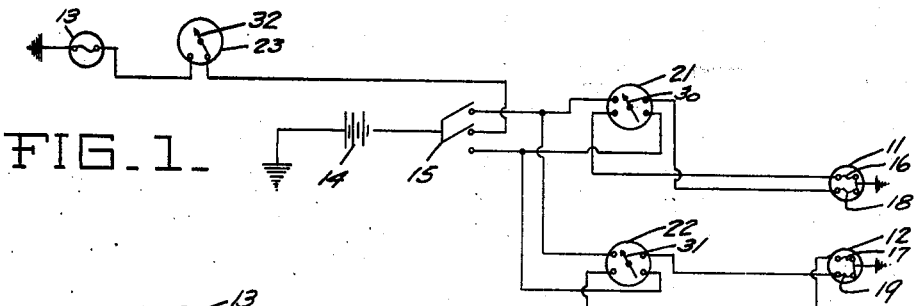
Figure 1 is a diagrammatic circuit representation illustrating how the device of the present invention is employed.

In Figure 1 we have shown a circuit including double filament head lamps 11 and 12, tail light 13, battery 14, and a double pole switch 15. This circuit is so connected that switch 15 can selectively energize one of two circuits, either that including tail light 13 and filaments 16 and 17 respectively in head lamps 11 and 12, or another circuit including tail lamp 13 and filaments 18 and 19 respectively in head lamps 11 and 12. The head lamps are of the usual double filament construction and variously disposed within the incandescent lamps so that different road illumination is secured when filaments 16 and 17 are used than when filaments 18 and 19 are employed.

Figure 3:
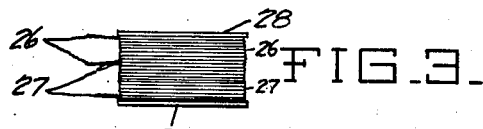
Figure 3 is a side elevation illustrating details of construction of a device employed.
Figure 4:
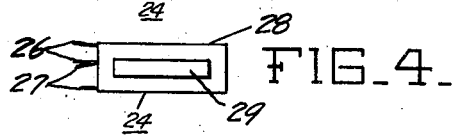
Figure 4 is a plan view of the device in Figure 3.

An indicating device 21 is provided for lamp 11 and another like device 22 for lamp 12 while a third indicator 23 is provided for the tail lamp. The devices 21 and 22 each include a field coil 24 (Figures 3 and 4) upon which are two separate field windings 26 and 27. Field winding 26 on device 21 is in series with filament 16 while winding 27 thereon is in series with filament 18. Likewise field winding 26 on device 22 is in series with filament 17 while winding 27 is in series with filament 19. Since the tail light includes usually but one filament, a single winding is included in device 23. The windings 26 and 27 are placed about a common field support member 28, usually a bakelite spool having an opening 29 to receive the rotor mechanism which is operated upon by current passage through the field coil to move the indicator arms 30, 31, and 32 of the devices 21, 22, and 23. This rotor and spool constructon, only insofar as the mounting of the rotor is concerned, is that usual to automotive ammeters such as sold under the name of "Readrite."

When switch 15 is moved to connect filaments 16 and 17 and the tail lamp 13 to the battery, current can flow through devices 21, 22, and 23, particularly through coils 26 in devices 21 and 22. If any one of the filaments is burned out, its associated device will not receive any current since its circuit is broken. Then, if filament 16 is burned out, indicator arm 30 will remain in the off position while the arms 31 and 32 will move to the on position.

The operator, by glancing at the devices can readily observe that only one light circuit is complete. If the light switch is turned to the other selected position, to provide a different road illumination, and both filaments 18 and 19 are intact, the indicating devices will show this by swinging over to the on position. Failure of the tail lamp is also indicated on device 23. In this way, a simple and inexpensive structure is provided since the same indicating structure is utilized for each head lamp and is selectively responsive to energization and failure of either filament in the same head lamp. Thus, instead of having to provide a separate indicating device for each filament, or a complicated wiring system including relays and balance circuits, with various special sockets and return wires, the present invention enables the lighting circuit of the automobile to be employed as installed after the indicating devices have been connected in series therewith.

Figure 6:
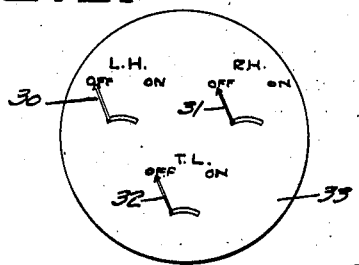
Figure 6 is a plan view of the indicator dial employed in connection with the circuit shown in Figure 1.

As appears in Figure 6, the several indicating devices 21, 22, and 23 can be mounted upon a common support member and the arms 30, 31, and 32 passed through a common dial 33 so that a single device is provided which can be readily installed as a unit. The unit includes a common case and support member carrying the devices and the means for connecting the units in the circuits.

Figure 2:
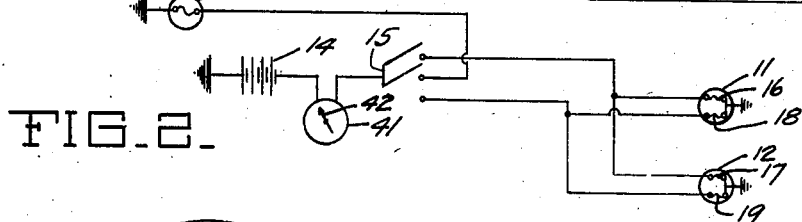
Figure 2 is another circuit.
Figure 5:
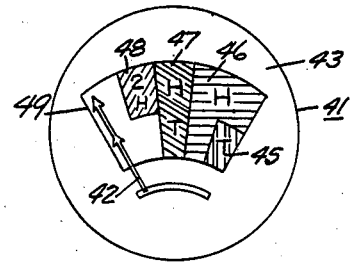
Figure 5 is a plan view of an indicator dial which can be employed.

In Figures 2 and 5 we have shown another form of the invention wherein a single indicating device 41 is included in series with the battery 14 and switch 15. This device includes an indicator arm 42 oscillatable over a dial 43, upon current passage through the associated field coil. The face of the dial is marked off into five different colored areas 44, 45, 46, 47, and 48 indicated by the shading in Figure 5, to correspond to the five possibilities of having a tail light, a head light, a tail light and a head light, both head lights, or all lights out. The operator by observing the dial, can readily determine if all light circuits are complete even though the head lamps include separate filaments. If the arm 42 swings back into any one of the colored areas, the driver is aware that a circuit has failed and which general circuit is at fault.

Figure 7:
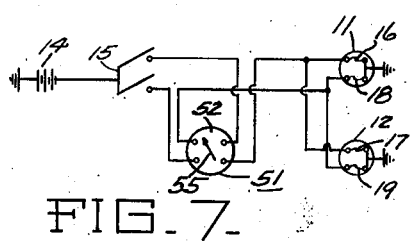
Figure 8:
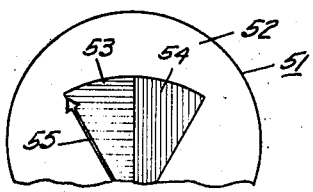

In Figures 7 and 8 we have shown another form of the invention wherein a device 51, similar to devices 21 and 22 in Figure 1, and including the two separate coils 26 and 27 to provide its field, is used. Coil 26 is in series with the circuit including both filaments 16 and 17 and coil 27 in series in the circuit including filaments 18 and 19. The dial 52 is divided into two segments 53 and 54 differently marked so that the position of arm 55 is readily ascertainable. When filaments 16 and 17 are burning, the arm is in segment 54. If one of the filaments fails, the arm drops back to segment 53. The same thing occurs with filaments 18 and 19 which can be selectively energized.

In Figures 9 and 10 is shown another modification wherein a line 61 is extended from switch 15 to a center tap 62 of a coil 63. Line 64 extends to filament 16 from one end of coil 63 while line 65 extends to filament 17 from the other end of said coil. Similarly, line 66 extends to center tap 67 on coil 68 from the ends of which lines 69 and 70 extend respectively to filaments 18 and 19. Both coils are wound on a common spool as with coils 26 and 27 in Figures 3 and 4 so as to provide a magnetic field for rotor mechanism for indicator arm 71. When current passes through line 61, the opposite portions of coil 63 will exert an opposed magnetic effect that will cause the rotor mechanism to maintain the arm in its center position on dial 72, as appears in Figure 10. However, if one of the filaments is burned out, only one end of the coil is energized and the arm will accordingly be moved to one side of the dial. The apparatus is preferably constructed so that the arm swings to the counter-clockwise direction to indicate the left hand light is out and clockwise to indicate that the right hand light is out.

Figures 11 and 12 show another modification along the lines of that in Figures 9 and 10. In this form taps 62 and 67 are respectively provided so that one side of the coil 63 and coil 68 has more magnetic effect than the other. This unbalance is offset by including, as a component of the field, coil 75, wound on the same spool, as coils 63 and 68, and included in the tail light circuit. Thus with filaments 16 and 18 and the tail light burning, arm 76 will be positioned as appears in Figure 12. If only filament 16 burns out, in the left hand head light, arm 76 swings to the left of dial 77 in Figure 12. If only the tail light burns out, the arm is swung to a position indicated by 78 (Figure 12) while when only the right hand head light burns out the arm swings almost completely to the right. The devices can be so constructed that the arm 76 only appears when one or more lights are burning.

While the invention has been disclosed in connection with automobile lighting circuits it can be used with such circuits on other dirigible vehicles and with lighting circuits generally as well as to indicate the failure of devices associated as are the lights 11 and 12.

We claim:
1. In combination, a main circuit including a plurality of filaments, a source of current for energizing said filaments, a movable indicator, a magnetized member for moving said indicator, and means for moving said magnetized member and said indicator including a field support member cooperating with said indicator and having a plurality of field coils wound thereon, each of said coils being in series with one of said filaments and having a magnetic field differing in strength from that of any other of said coils upon current flow therethrough, all of said coils being wound on said support to move said magnetized member in the same direction upon current flow therethrough.

2. A lighting system comprising a source of current supply, a right hand head light, a left hand head light, a tail light, each of said lights being in parallel with the other and said source of current so that failure of one does not affect lighting of the other, an indicator having a movably mounted indicating member, a magnetized member for moving said indicating member, an indicator coil in series with each of said lights, each indicator coil having a different magnetic effect on said magnetized member from any other coil but all of said coils acting on said magnetized member to move the indicator in the same direction whereby failure of a particular light or any two lights is plainly indicated.

3. A lighting system comprising a source of current supply, a right hand head light, a left hand head light, a tail light, each of said lights being in parallel with the other and said source of current so that failure of one does not affect lighting of the other, an indicator having a movably mounted indicating member, an indicator coil in series with said tail light, a second indicator coil in series with one of said head lights, a third indicator coil in series with the other of said head lights, a magnetized member for moving said indicator and movable in the common magnetic field of all said coils, said second coil having substantially twice the ability to move said magnetized member in a given direction as said first coil and only half that of said third coil, all of said coils acting to move the magnetized member in the same direction whereby said indicator is actuated to show failure of a particular light or any two lights is plainly indicated.

WILLIAM F. BEISLEY.
HARRY D. SPRADLIN.
LOUIS R. DEADRICH.
ROBERT H. ECKHOFF.